United States Patent
Hwang

(10) Patent No.: US 9,030,467 B2
(45) Date of Patent: May 12, 2015

(54) ELECTRONIC APPARATUS AND METHOD FOR DISPLAYING GRAPHICAL USER INTERFACE AS 3D IMAGE

(75) Inventor: Dochung Hwang, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 13/181,097

(22) Filed: Jul. 12, 2011

(65) Prior Publication Data

US 2012/0013612 A1 Jan. 19, 2012

(30) Foreign Application Priority Data

Jul. 13, 2010 (KR) .................. 10-2010-0067377

(51) Int. Cl.
*H04N 13/00* (2006.01)
*H04N 13/04* (2006.01)

(52) U.S. Cl.
CPC .......... *H04N 13/007* (2013.01); *H04N 13/0022* (2013.01); *H04N 13/004* (2013.01); *H04N 13/0456* (2013.01); *H04N 13/0475* (2013.01)

(58) Field of Classification Search
CPC .......... H04N 13/0468; H04N 13/0055; H04N 13/0285; H04N 13/0402; H04N 13/0456; H04N 2013/0081; H04N 13/0475; H04N 13/0278; H04N 13/007; H04N 2013/0465; H04N 13/026; H04N 13/0275; H04N 13/0018; H04N 13/004; H04N 13/0488; G06F 3/0482; G06F 3/0481; G06F 2203/04804; G06F 9/4443; G06F 3/04815; G06F 3/011; G06T 19/20; G06T 2200/24; G06T 2207/10012; G06T 2207/20144; G06T 19/00; G06T 2207/10021; A63B 2220/13; G09G 5/14; G02B 27/22; G06N 3/004
See application file for complete search history.

(56) References Cited

U.S. PATENT DOCUMENTS

| | | | |
|---|---|---|---|
| 5,953,013 A * | 9/1999 | Shimizu .................. | 345/419 |
| 6,313,866 B1 * | 11/2001 | Akamatsu et al. ........... | 348/51 |
| 2003/0142068 A1 * | 7/2003 | DeLuca et al. ............. | 345/156 |
| 2004/0246272 A1 * | 12/2004 | Ramian .................. | 345/660 |
| 2010/0021141 A1 * | 1/2010 | Yamashita et al. ........... | 386/109 |
| 2010/0074594 A1 * | 3/2010 | Nakamura et al. ............. | 386/92 |

FOREIGN PATENT DOCUMENTS

| | | |
|---|---|---|
| CN | 101266546 A | 9/2008 |
| EP | 0905988 A1 | 3/1999 |
| EP | 1806933 A2 | 7/2007 |
| EP | 2 194 504 A1 | 6/2010 |
| WO | WO 00/02187 A1 | 1/2000 |

* cited by examiner

*Primary Examiner* — Kee M Tung
*Assistant Examiner* — Haixia Du
(74) *Attorney, Agent, or Firm* — Birch, Stewart, Kolasch & Birch, LLP

(57) ABSTRACT

An electronic apparatus and a method for displaying a graphical user interface are disclosed. A position determination module determines the position of a user. A controller calculates a depth setting value based on a predetermined distance value and the determined position and adjusts depth values of a plurality of graphical user interfaces (GUIs) based on the calculated depth setting value. A display displays the plurality of GUIs with the adjusted depth values. The plurality of GUIs is displayed at respective output positions.

20 Claims, 14 Drawing Sheets

(a)

(b)

ELECTRONIC APPARATUS AND METHOD FOR DISPLAYING GRAPHICAL USER INTERFACE AS 3D IMAGE

This application claims the benefit of Korean Patent Application No. 10-2010-0067377, filed on Jul. 13, 2010, which is hereby incorporated by reference as if fully set forth herein.

BACKGROUND OF THE INVENTION

1. Field of the Invention

One or more embodiments described herein relate to processing of a Graphical User Interface (GUI) for presentation on a screen.

2. Discussion of the Related Art

Analog broadcast environments have been rapidly transitioned to digital broadcast environments. In digital broadcasts, the amount of content has been considerably increased and the types of content have been diversified, as compared to analog broadcasts of the related art. In particular, recently, production of three-dimensional (3D) content which provides realism and stereoscopic effect as compared to two-dimensional (2D) content has increased.

An electronic apparatus is a multi-function apparatus, which has been developed to perform the function of a digital broadcast receiver in addition to playback of 3D content or to become compatible with another electronic apparatus.

However, in an electronic apparatus for displaying a 3D image of the related art, when a user selects a menu output, a menu output position is set by setting of a manufacturer, regardless of a user position or a distance between the electronic apparatus and the user. Thus, it is inconvenient for the user to use a menu.

SUMMARY OF THE INVENTION

Accordingly, the present invention is directed to an electronic apparatus and method for displaying a Graphical User Interface (GUI) as a 3-dimensional (3D) image that substantially obviates one or more problems due to limitations and disadvantages of the related art.

An object of the present invention is to provide an electronic apparatus for controlling and outputting a position and depth of a GUI while providing the GUI as 3D image data according to a user position or user preference so as to increase user convenience and a method for displaying the GUI as a 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying a graphical user interface (GUI) includes receiving a GUI output command, determining the position of a user according to the GUI output command, determining an output position of the GUI according to the determined position of the user, and outputting the GUI at the determined position in a 3D format.

In another aspect of the present invention, an electronic apparatus includes a user input unit configured to receive a graphical user interface (GUI) output command, a position determination module configured to determine the position of a user according to the GUI output command, a controller configured to determine an output position of the GUI according to the determined position of the user, and an output formatter configured to output the GUI at the determined position in a 3D format.

In another aspect of the present invention, a method of displaying a graphical user interface (GUI) includes determining the position of a user, calculating a depth setting value based on a predetermined distance value and the determined position, adjusting depth values of a plurality of GUIs based on the calculated depth setting value, and displaying the plurality of GUIs with the adjusted depth values. The plurality of GUIs may be displayed at respective output positions. The plurality of GUIs may include at least one menu item.

The setting the depth setting value may include calculating the individual depth setting value of each of the plurality of GUIs, and the individual depth setting value may be calculated based on the predetermined distance value, the determined position and the output position.

The depth value may be adjusted such that a distance between the user and a 3-dimensional (3D) image of the GUI becomes the predetermined distance value.

The adjusting the depth value may include accessing a first set of pixel data for displaying one left-view image and a second set of pixel data for displaying one right-view image of the plurality of GUIs in a storage medium, and adjusting a gap between a pixel included in the accessed first set of pixel data and a pixel included in the accessed second set of pixel data based on the depth setting value. The method may further include receiving a 3-dimensional (3D) image including left-view image data and right-view image data, mixing the left-view image data and the first set of pixel data and mixing the right-view image data and the second set of pixel data, and outputting an image signal for displaying the mixed left-view image data and the mixed right-view image data to a display.

The method may further include mixing sets of pixel data for displaying the plurality of GUIs based on the output positions.

The method may further include determining whether the position of the user is changed, the determining the position of the user may be performed at a predetermined time interval and, when the position of the user is changed, the depth setting value may be calculated.

The method may further include detecting a user action for requesting output position setting, and displaying a GUI for setting at least one of the predetermined distance value or the output positions in response to the detected user action. The displayed GUI may include at least one image associated with one of the plurality of GUIs, and the output positions may be determined based on a position where the image is located. The image may be moved according to detected user action.

In another aspect of the present invention, an electronic apparatus includes a position determination module configured to determine the position of a user, a controller configured to calculate a depth setting value based on a predetermined distance value and the determined position and adjust depth values of a plurality of graphical user interfaces (GUIs) based on the calculated depth setting value, and a display configured to display the plurality of GUIs with the adjusted depth values. The plurality of GUIs may be displayed at respective output positions. The plurality of GUIs may include at least one menu item.

The controller may calculate the individual depth setting value of each of the plurality of GUIs, and the individual depth setting value may be calculated based on the predetermined distance value, the determined position and the output position.

The controller may adjust the depth value such that a distance between the user and a 3-dimensional (3D) image of the GUI becomes the predetermined distance value.

The controller may access a first set of pixel data for displaying one left-view image and a second set of pixel data for displaying one right-view image of the plurality of GUIs in a storage medium, and adjust a gap between a pixel included in the accessed first set of pixel data and a pixel included in the accessed second set of pixel data based on the depth setting value.

The electronic apparatus may further include a receiver configured to receive a 3-dimensional (3D) image including left-view image data and right-view image data, a mixer configured to mix the left-view image data and the first set of pixel data and mix the right-view image data and the second set of pixel data, and a formatter configured to output an image signal for displaying the mixed left-view image data and the mixed right-view image data.

The electronic apparatus may further include a mixer configured to mix sets of pixel data for displaying the plurality of GUIs based on the output positions.

The position determination module may sense the position of the user at a predetermined time interval, and the controller may determine whether the position of the user is changed and calculate the depth setting value based on the changed position of the user when the position of the user is changed.

The controller may detect a user action for requesting output position setting, and control display of a GUI for setting at least one of the predetermined distance value or the output positions in response to the detected user action.

The displayed GUI may include at least one image associated with one of the plurality of GUIs and the output positions may be determined based on a position where the image is located. The image may be moved according to detected user action.

Accordingly, in the present invention, if a GUI is output in a 3D output mode, the position of the GUI to be output in correspondence with the user position is computed and output such that the user views the GUI at the same position with the same size. Therefore, it is possible to enable the user to feel secure about the GUI regardless of the distance from the electronic apparatus and increase user convenience.

That is, if a GUI (that is, a menu) is unevenly viewed in a 3D output mode for outputting 3D image data, it is difficult for the user to perceive the GUI. The present invention can solve this problem.

In the present invention, since not only the distance between the user and the GUI but also the output position of the GUI is maintained regardless of the user position, it is possible to give security to the user in the output of the GUI.

Accordingly, in the present invention, it is possible to provide a GUI for enabling a user to set the output position of a GUI to be output in 3D and determine and provide the output position of the GUI according to user selection. Therefore, the user can perform menu setting selection at a desired position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
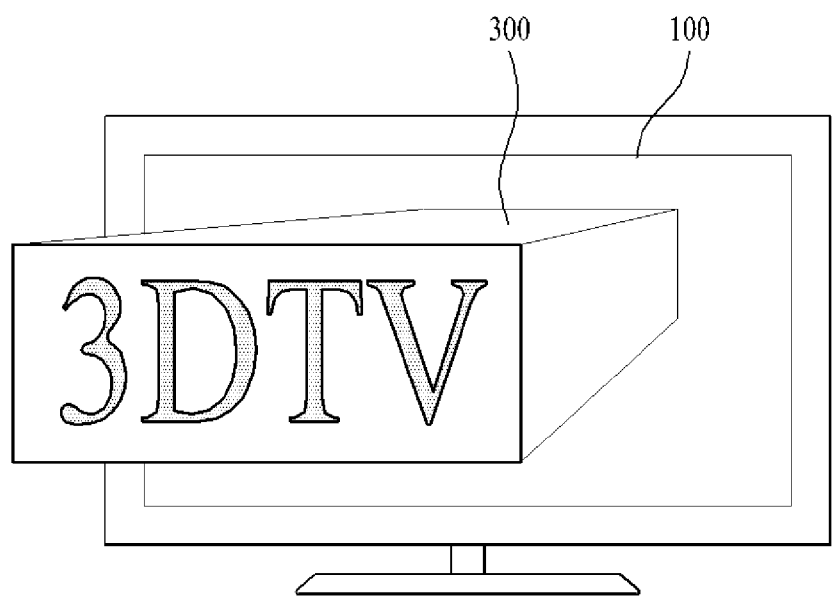
FIG. 1 is a diagram showing an electronic apparatus for providing 3-dimensional (3D) content according to an embodiment of the present invention.
Figure 1:
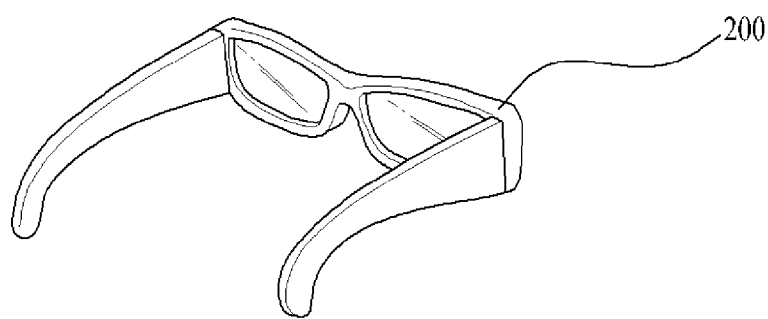

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention be understood not simply by the actual terms used but by the meanings of each term lying within.

The present invention relates to a method of displaying a Graphical User Interface (GUI) of an electronic apparatus for outputting 3-dimensional (3D) content and an electronic apparatus employing the method. Hereinafter, embodiments of the present invention will be described in detail with reference to the accompanying drawings.

The configuration and action of the present invention shown in the drawings and described with reference to the drawings will be described as at least one embodiment; however, the technical idea and the core configuration and action of the present invention are not limited thereto.

FIG. 1 is a diagram showing an electronic apparatus for providing 3-dimensional (3D) content according to an embodiment of the present invention.

In the present invention, a method of displaying 3D content includes a glasses method and a non-glasses method. The glasses method is divided into a passive type and an active type. In the passive type, a left-view image and a right-view image are separately displayed using a polarization filter. Alternatively, a method of using glasses having a blue-color lens and a red-color lens is also included in the passive type. In the active type, left and right eyes are identified using a liquid crystal shutter and the left eye and the right eye are hidden in time series so as to separate a left image and a right image. That is, in the active type, the temporally divided screen is periodically repeated and glasses having an electronic shutter synchronized with the period are used. The active type is also referred to as a time split type or a shuttered glasses type. Representative examples of the non-glasses method include a lenticular method in which a lenticular lens plate in which a cylindrical lens array is vertically arranged is provided in front of an image panel and a parallax barrier method including a barrier layer having a periodic slit on an image panel.

FIG. 1 shows an embodiment of using a stereoscopic method of 3D display methods and an active type of the stereoscopic method. Although shuttered glasses are described as an active type medium, the present invention is not limited thereto and is applicable to other mediums.

Referring to FIG. 1, the electronic apparatus 100 according to the embodiment of the present invention outputs 3D image data on a display unit, generates a synchronization signal Vsync for synchronization of the 3D image data, and outputs the synchronization signal Vsync to an IR emitter (not shown) of shuttered glasses 200, thereby enabling a user to view a 3D image using the shuttered glasses 200.

The electronic apparatus 100 may be a personal computer system such as a desktop, a laptop, a tablet or a handheld personal computer (PC). In addition, the electronic apparatus 100 may be a mobile terminal such as a mobile telephone, a smart phone, a Personal Digital Assistants (PDA), a Portable Multimedia Player (PMP) or a navigation device or a fixed terminal such as an image display device or a digital TV receiver.

The shuttered glasses 200 control an open period of a left-eye or right-eye shutter liquid crystal panel according to the synchronization signal received through the IR emitter (not shown) so as to synchronize a 3D image 300 output from the electronic apparatus 100.

The electronic apparatus 100 may process the 3D image data based on stereoscopy. That is, one object is photographed using two cameras located at different positions so as to generate left-view image data and right-view image data, the left-view image data and the right-view image data are respectively orthogonally input to the left eye and the right eye of a viewer, and the left-view image data and the right-view image data respectively input to the left eye and the right eye are combined by the brain, thereby generating a 3D image. The arrangement of the left-view image data and the right-view image data to be orthogonal to each other indicates that the left-view image data and the right-view image data do not cause mutual interference.

Figure 2:
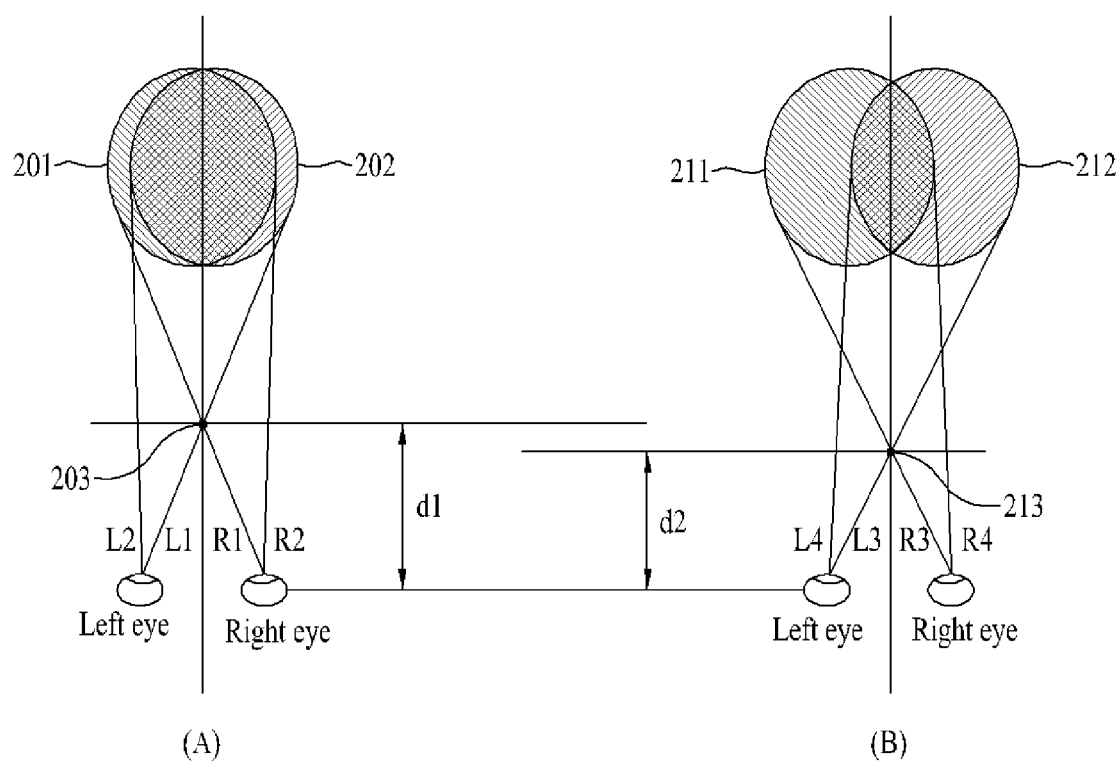
FIG. 2 is a diagram illustrating perspective according to a gap or disparity between left-view image data and right-view image data.

FIG. 2 is a diagram illustrating perspective according to a gap or disparity between left-view image data and right-view image data.

FIG. 2(A) shows the position 203 of an image formed by the right-view image data 201 and the left-view image data 202 if the gap between the right-view image data 201 and the left-view image data 202 is small, and FIG. 2(B) shows the position 213 of an image formed by the right-view image data 211 and the left-view image data 211 if the gap between the right-view image data 211 and the left-view image data 212 is large.

That is, FIGS. 2(A) and 2(B) show perspective degrees of images formed at different positions according to the gap between the left-view image data and the right-view image data in an image processing apparatus.

Referring to FIG. 2(A), when extensions R1 and R2 from the right eye to one side and the other side of the right-view image data 201 and extensions L1 and L2 from the left eye to one side and the other side of the left-view image data 202 are drawn, an image is formed at a point 203 where the extension R1 of the right-view image data and the extension L1 of the left-view image data cross each other at a position separated from the right eye and the left eye by a predetermined distance d1.

Referring to FIG. 2(B), an image is formed at a point 213 where the extension R3 of the right-view image data and the extension L3 of the left-view image data cross each other at a position separated from the right eye and the left eye by a predetermined distance d2, similar to FIG. 2(A).

When the distances d1 (FIG. 2(A)) and d2 (FIG. 2(B)) between the left and right eyes and the positions 203 and 213 where the images are formed are compared, d1 is greater than d2. That is, the image shown in FIG. 2(A) is formed at a position further from the left and right eyes than the position of the image shown in FIG. 2(B).

The reason why the distances d1 and d2 are different is because the gaps between the right-view image data and the left-view image data (in a horizontal direction of FIG. 2) are different.

For example, the gap between the right-view image data 201 and the left-view image data 202 of FIG. 2(A) is narrower than the gap between the right-view image data 211 and the left-view image data 212 of FIG. 2(B).

Therefore, as can be seen from FIGS. 2(A) and 2(B), as the gap between the right-view image data and the left-view image data is reduced, the distance between the image formed by the left-view image data and the right-view image data and the person's eyes is increased.

3D image data is implemented as a 3D image using various methods such as a method of providing a tilt or depth or a method of providing a 3D effect.

Figure 3:
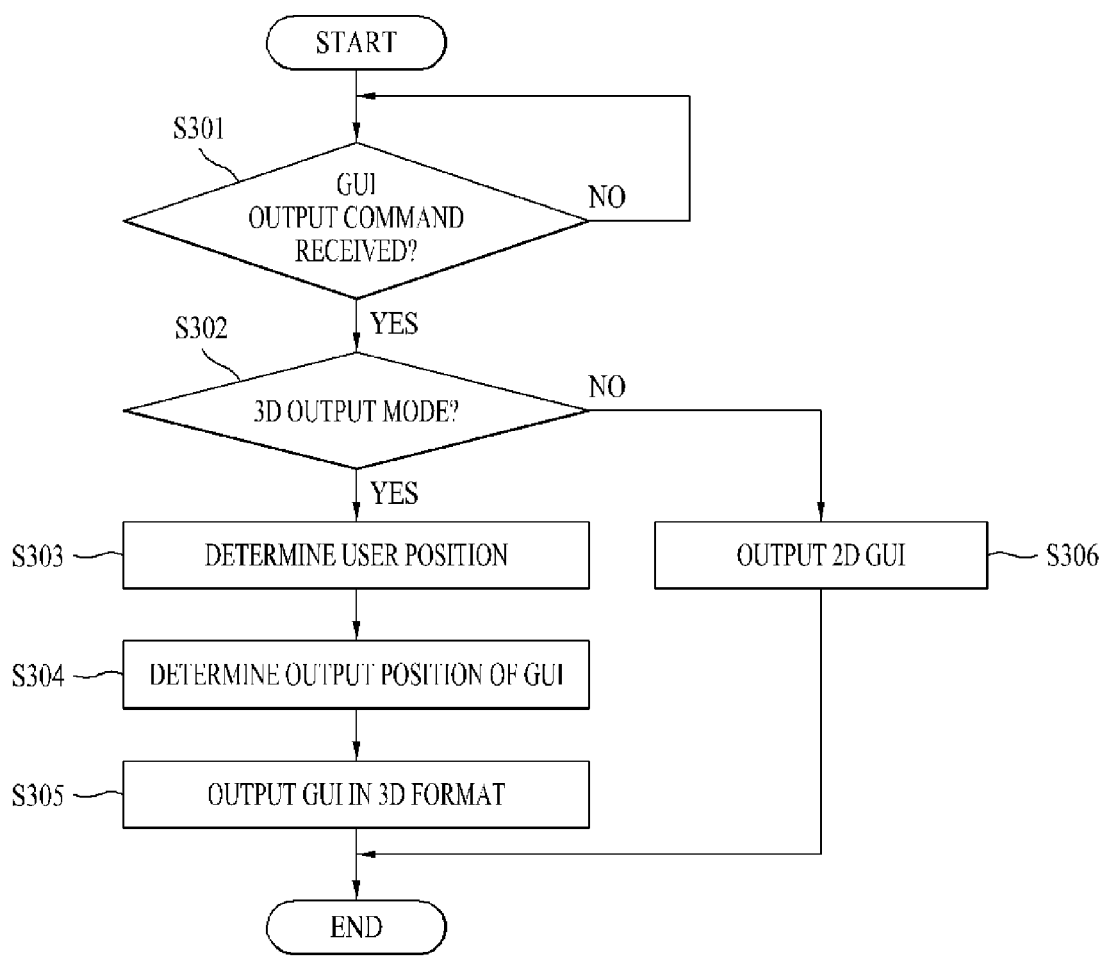
FIG. 3 is a diagram showing a process of providing a 3D Graphical User Interface (GUI) in an electronic apparatus according to an embodiment of the present invention.

FIG. 3 is a diagram showing a process of providing a 3D Graphical User Interface (GUI) in an electronic apparatus according to an embodiment of the present invention.

Referring to FIG. 3, the electronic apparatus according to the embodiment of the present invention determines whether a GUI output command is received in step S301. The GUI output command for outputting a GUI related to an operation of the electronic apparatus may be received from a user, for example, a predetermined remote controller. The GUI output command may be user action sensed by the electronic apparatus. Here, the user action may include physical selection for a button of the electronic device or a remote control, implementation of a predetermined gesture on a touch screen display, selection for a soft button and implementation of a predetermined gesture recognized from an image photographed by a photographing device and implementation of a predetermined voice recognized by voice recognition.

In step S302, the electronic apparatus 100 determines whether a 3D output mode is set. The 3D output mode enables a 3D output formatter to set an image signal to be output in a 3D format and a 2D output mode enables an image signal to bypass a 3D output formatter such that the image signal is output in a 2D format.

If it is determined that the 2D output mode is set in step S302, the electronic apparatus 100 outputs the GUI corresponding to the GUI output command in 2D in step S306.

If it is determined that the 3D output mode is set in step S302, the electronic apparatus determines a user position according to the GUI output command in step S303.

At this time, various embodiments may be applied to a method of determining a user position. For example, if the electronic apparatus 100 of the present invention is of a non-glasses type, a sensor included in the electronic apparatus 100 may detect a user position so as to generate position information. If the electronic apparatus 100 of the present invention is of a glasses type, the position of shuttered glasses is detected or position information is received from the shuttered glasses so as to acquire the position information of the shuttered glasses.

For example, the shuttered glasses 200 may sense a user position using a position sensor and transmit the sensed information to the electronic apparatus 100. The electronic apparatus 100 may receive the sensed information from the shuttered glasses 200 and determine the position of the shuttered glasses, that is, the user position, using the received information.

Alternatively, an IR sensor may be mounted in the electronic apparatus 100 so as to detect an IR signal transmitted from the shuttered glasses, calculate a distance from the shuttered glasses in x, y and z axes, and determine the position of the shuttered glasses.

According to another embodiment, a camera module may be included in the electronic apparatus 100 so as to capture an image, identify a predetermined pattern (an image of shuttered glasses or a user face) from the captured image and analyze the size or angle of the identified pattern, thereby determining a user position.

According to another embodiment, an IR transmission module may be mounted in the electronic apparatus 100 and an IR camera may be mounted in the shuttered glasses 200 so as to analyze image data of the IR transmission module captured by the IR camera, thereby determining the position of the shuttered glasses 200. At this time, if a plurality of IR transmission modules is mounted, images of the plurality of IR transmission modules of the image captured by the IR camera of the shuttered glasses 200 are analyzed so as to determine the position of the shuttered glasses 200. The position of the shuttered glasses 200 may be used as the user position.

Next, in step S304, the electronic apparatus 100 determines an output position of the GUI according to the determined user position. In step S305, the electronic apparatus 100 outputs the GUI at the determined position in a 3D format.

At this time, according to the exemplary embodiment of the present invention, the electronic apparatus 100 determines a depth value of the GUI such that a distance between the GUI and the user becomes a predetermined value and outputs the GUI in the 3D format. That is, the electronic apparatus 100 may calculate a depth setting value based on the predetermined value and the determined user position and adjust the depth value of the GUI based on the calculated depth setting value.

According to the exemplary embodiment of the present invention, the electronic apparatus 100 may determine a depth value of the GUI such that a distance between the GUI and the user becomes a distance set by the user. That is, the electronic apparatus 100 may calculate a depth setting value based on the distance set by the user and the determined user position and adjust the depth value of the GUI based on the calculated depth setting value.

At this time, the electronic apparatus 100 may separately provide a GUI for setting the distance between the GUI and the user.

According to the exemplary embodiment of the present invention, the electronic apparatus 100 may enable the user to set the output position of the GUI in correspondence with the user position, store the output position information of the GUI set by the user in a memory, determine the output position of the GUI according to the determined user position, and determine the output position of the GUI by referring to the memory. In some embodiments of the present invention, the electronic apparatus 100 may calculate the same depth setting value with respect to a plurality of GUIs and adjust the depth values of the plurality of GUIs based on the calculated depth setting value. In some embodiments of the present invention, the electronic apparatus 100 may calculate an individual depth setting value of each of a plurality of GUIs and adjust the depth value of each GUI based on the calculated individual depth setting value. The individual depth setting value may be calculated based on a predefined distance value, the determined user position and the determined output position. The predefined distance value may be a distance set by the user or a default distance between the GUI and the user.

At this time, the electronic apparatus 100 may provide a GUI for enabling the user to set the output position of the GUI in correspondence with the user position.

The output position of the GUI may be differently set according to a plurality of GUIs and the output position of the GUI may be differently set according to users.

According to the exemplary embodiment of the present invention, the electronic apparatus 100 senses the user position at a predetermined time interval. When the user position is changed, the output position of the graphical user interface may be changed in correspondence with the change in user position.

Figure 4:
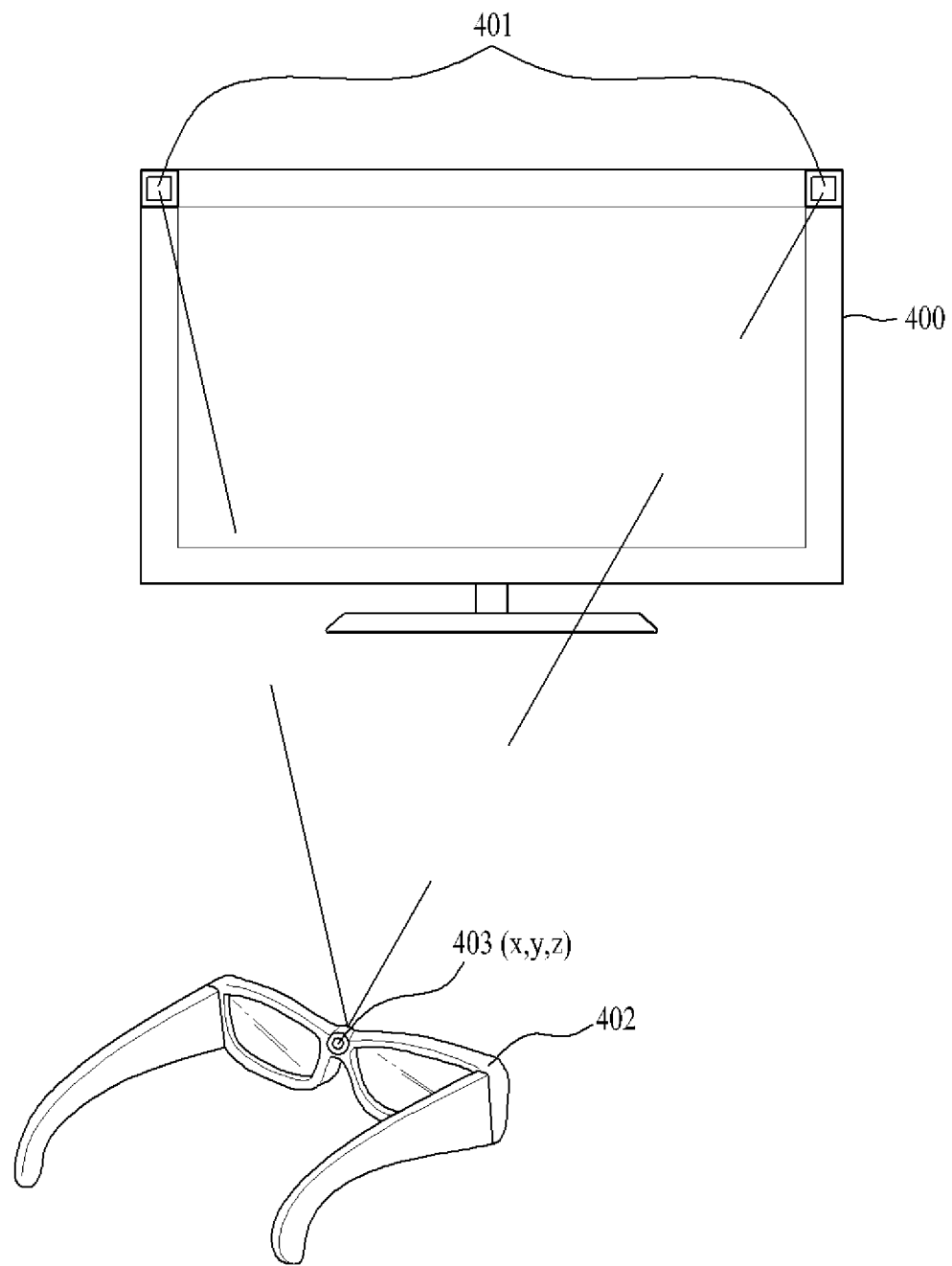
FIG. 4 is a diagram showing determination of user position according to an embodiment of the present invention.

FIG. 4 is a diagram showing determination of user position according to an embodiment of the present invention. FIG. 4 shows a glasses type electronic apparatus.

Referring to FIG. 4, the electronic apparatus 400 according to the embodiment of the present invention includes a predetermined position sensor 401 to determine whether the position of the shuttered glasses 402 is changed.

The shuttered glasses 402 include a predetermined IR output unit or IR sensor 403 to enable the electronic apparatus 400 to determine the position of the shuttered glasses.

Figure 5:
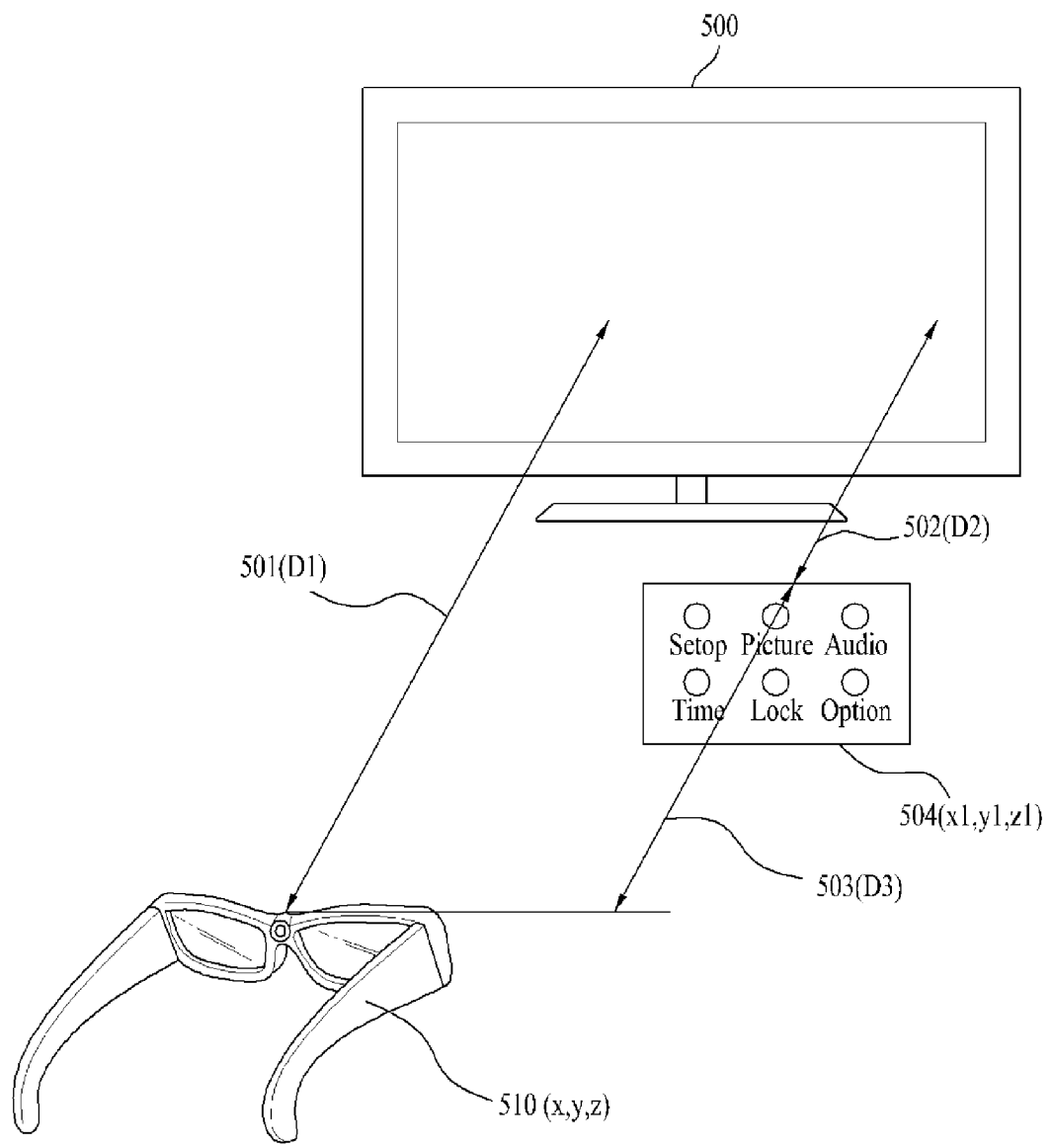
FIG. 5 is a diagram showing an output of a GUI at a predetermined distance from a user position according to an embodiment of the present invention.

FIG. 5 is a diagram showing an output of a GUI at a predetermined distance from a user position according to an embodiment of the present invention.

Referring to FIG. 5, the electronic apparatus 500 according to the embodiment of the present invention may determine a depth value of a GUI 504 to D2 502 such that a distance between shuttered glasses 510 and the GUI 504 becomes D3 503 and output the GUI in a 3D format, if it is determined that the user position, that is, the distance between the shuttered glasses 510 and the electronic apparatus 500, is a distance D1 501.

At this time, the user position, that is, the distance D3 503 between the shuttered glasses 510 and the GUI 504 may be set to an optimal default value or a value input by the user using a predetermined GUI.

Figure 6:
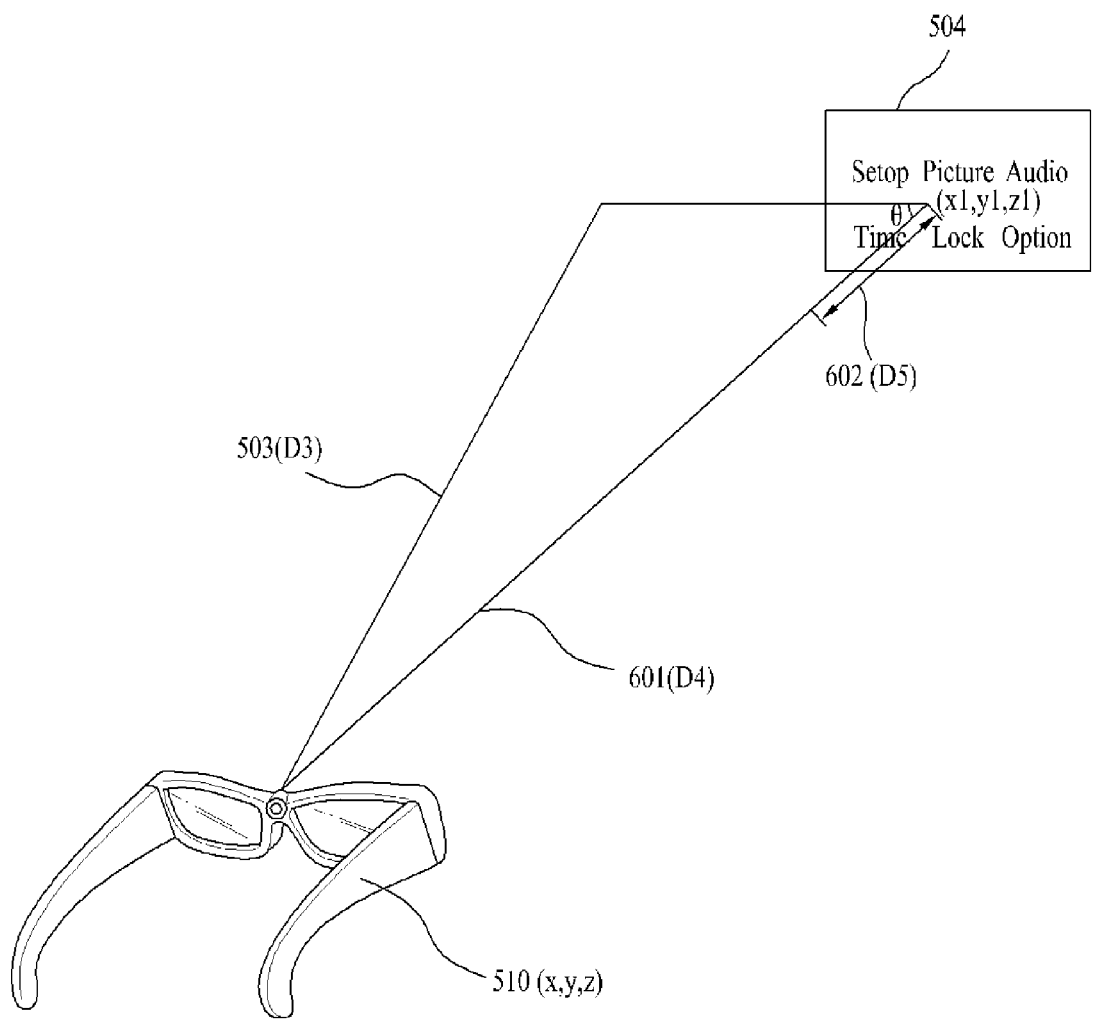
FIG. 6 is a diagram showing an output of a GUI at a predetermined distance from a user position according to an embodiment of the present invention.

FIG. 6 is a diagram showing an output of a GUI at a predetermined distance from a user position according to an embodiment of the present invention.

Referring to FIG. 6, the electronic apparatus according to the embodiment of the present invention may output a GUI 504 at a predetermined position from a user, that is, the shuttered glasses 510.

That is, the electronic apparatus may determine the output position (x1, y1, z1) of the GUI such that an angle between a horizontal plane of the GUI 504 and a straight line connecting the user position 510 and a central point of the GUI becomes θ and process and output the GUI in a 3D format.

The electronic apparatus may calculate D4 601 based on the stored output position (x1, y1, z1) and D3 503 and calculate an individual depth setting value D5 602 based on D4 601 and D3 503.

Figure 7:
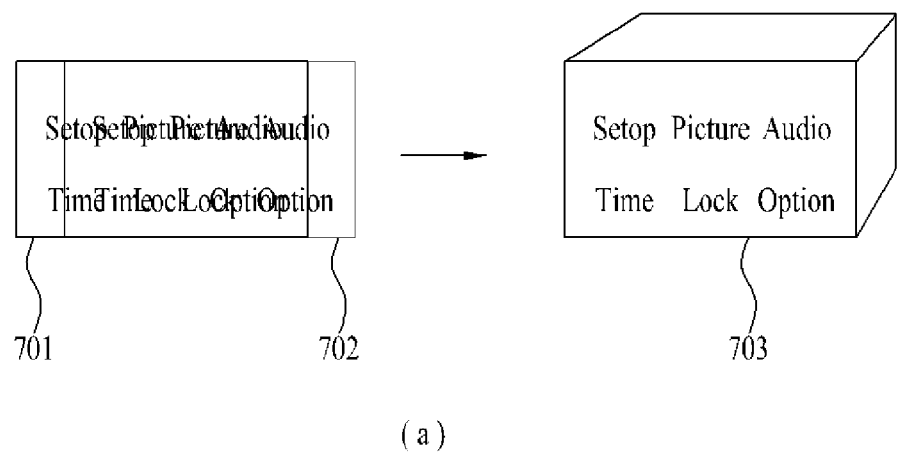
FIG. 7 is a diagram illustrating an example of a method of implementing a 3D image in an electronic apparatus according to the present invention.
Figure 7:
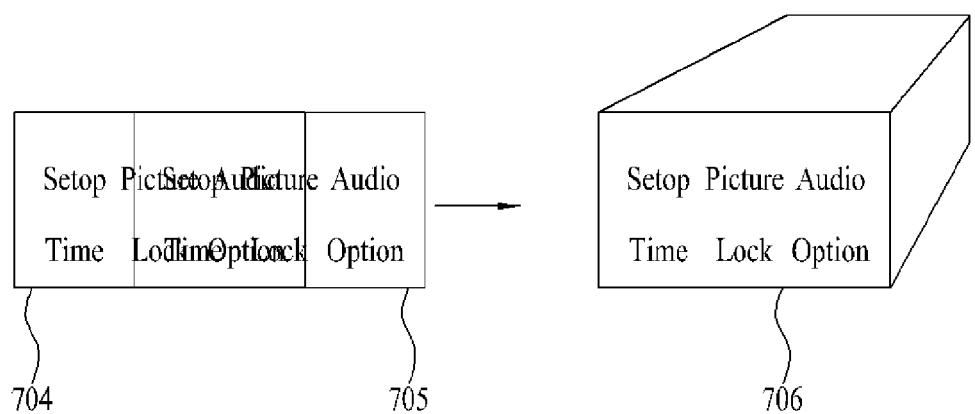

FIG. 7 is a diagram illustrating an example of a method of implementing a 3D GUI in an electronic apparatus according to the present invention.

FIG. 7(A) shows the case where a gap between left-view image data 701 and right-view image data 702 configuring a 3D GUI is narrow and FIG. 7(B) shows the case where a gap between left-view image data 704 and right-view image data 705 configuring a 3D GUI is wide.

Accordingly, in the 3G GUI implemented according to the gap between the image data in FIGS. 7(A) and 7(B), according to the principle of FIG. 2, the 3D image 703 shown in FIG. 7(A) appears to be located a long distance from the person's eyes and the 3D UI 706 shown in FIG. 7(B) appears to be located a short distance from the person's eyes, that is, appears to protrude. Based upon the above-described principle, that is, by adjusting the gap between the left-view image data and the right-view image data configuring the 3D GUI, it is possible to give appropriate depth to the UI so as to obtain a 3D effect.

Figure 8:
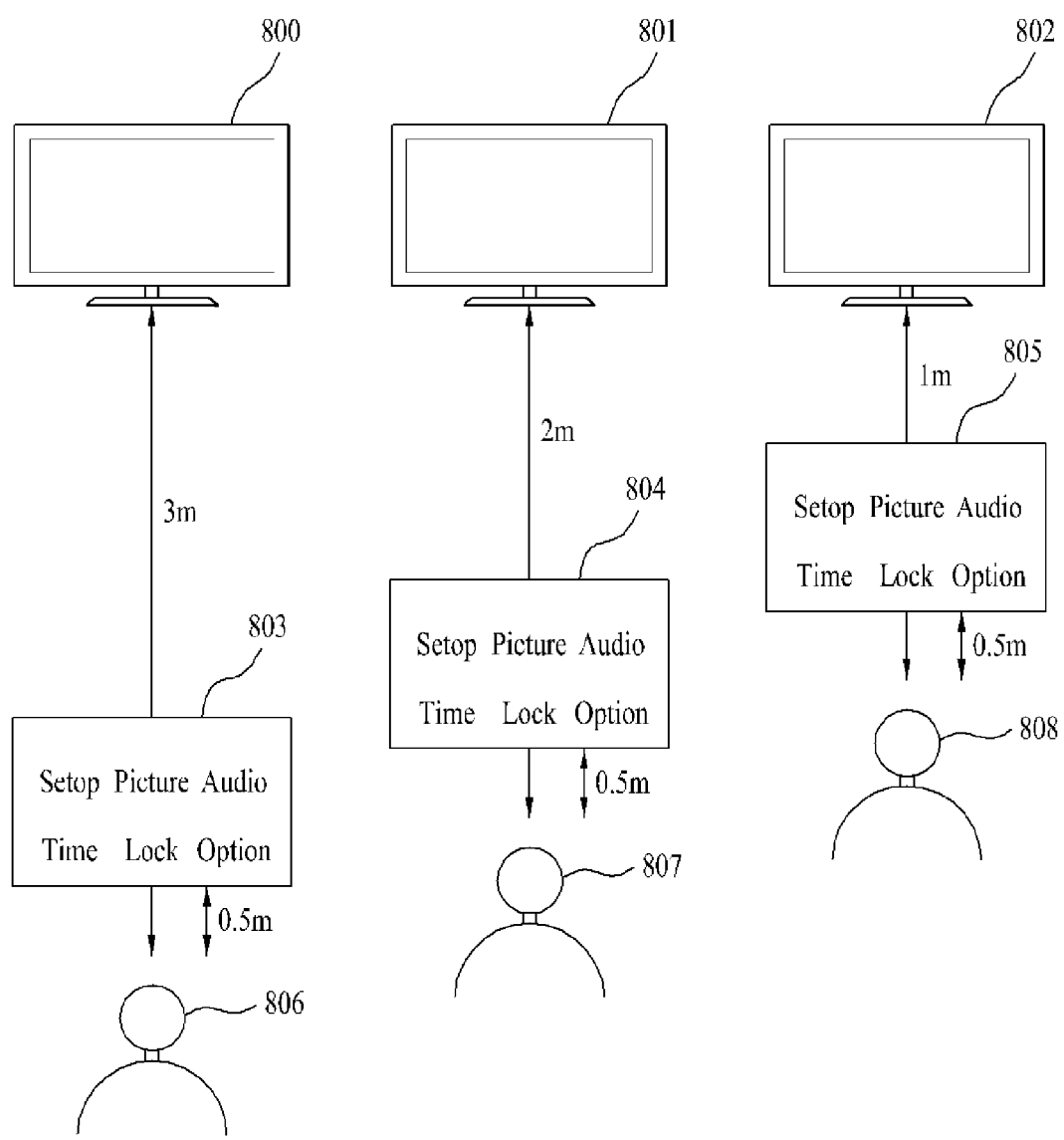
FIG. 8 is a diagram showing change in output position of a GUI according to change in user position according to an embodiment of the present invention.

FIG. 8 is a diagram showing change in output position of a GUI according to change in user position according to an embodiment of the present invention.

Referring to FIG. 8, if a distance between an electronic apparatus 800 and a user position 806 according to the embodiment of the present invention is 3 m, a depth value of a GUI 803 is set to 2.5 m such that the distance between the user position 806 and the GUI 803 becomes 0.5 m.

If a distance between an electronic apparatus 801 and a user position 807 is 2 m, a depth value of a GUI 804 is set to 1.5 such that the distance between the user position 807 and the GUI 804 becomes 0.5 m.

If a distance between an electronic apparatus 802 and a user position 808 is 1 m, a depth value of a GUI 805 is set to 0.5 such that the distance between the user position 808 and the GUI 805 becomes 0.5 m.

At this time, the electronic apparatus may sense the user position at a predetermined time interval and change the output position of the GUI when the user position is changed, as described above.

That is, if the user moves to the position 806, the position 807 or the position 808, the GUI may be moved to the position 803, the position 804 or the position 805 so as to maintain a constant distance between the GUI and the user position.

The output position of the GUI may be differently set according to a plurality of GUIs and the output position of the GUI may be differently set according to users, as described above.

Accordingly, in the present invention, if a GUI is output in a 3D output mode, the position of the GUI to be output in correspondence with the user position is computed and output such that the user views the GUI at the same position with the same size. Therefore, it is possible to enable the user to feel secure about the GUI regardless of the distance from the electronic apparatus and increase user convenience.

That is, if a GUI (that is, a menu) is unevenly viewed in a 3D output mode for outputting 3D image data, it is difficult for the user to perceive the GUI. The present invention can solve this problem.

In the present invention, since not only the distance between the user and the GUI but also the output position of the GUI is maintained regardless of the user position, it is possible to give security to the user in the output of the GUI.

Figure 9:
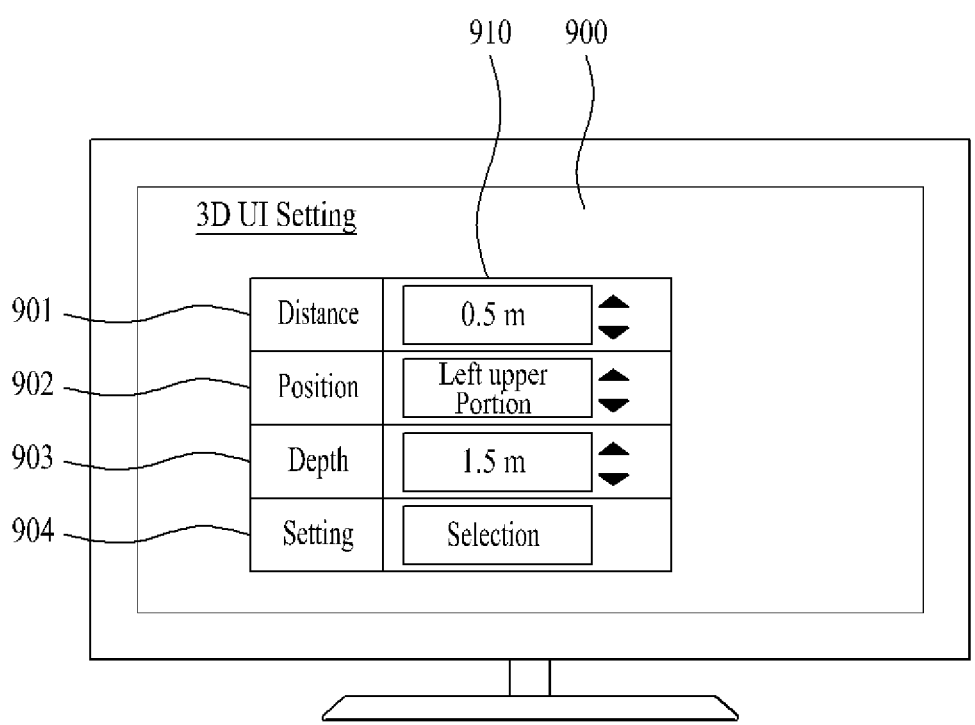
FIG. 9 is a diagram showing a GUI for setting an output position of a 3D GUI according to an embodiment of the present invention.

FIG. 9 is a diagram showing a GUI for setting an output position of a 3D GUI according to an embodiment of the present invention.

Referring to FIG. 9, the electronic apparatus 900 according to the embodiment of the present invention may output a GUI 910 for setting a distance 901 between the GUI and the user, a coarse position 902 where the GUI will be output, a depth value 903 of the GUI, or a fine position 904 where the GUI will be output.

For example, the user may set the distance 901 between the GUI and the user to "0.5 m". When receiving a GUI output command, the electronic apparatus determines a user position, adjusts the depth value of the GUI and outputs the GUI in a 3D format, such that the distance between the user position and the GUI becomes 0.5 m.

The user may select the coarse position 902 where the GUI will be output. For example, the user may select one of "left upper portion", "left lower portion", "center", "right upper portion" and "right lower portion". When the user selects the coarse position where the GUI will be output, the electronic apparatus 900 may output the GUI at the selected position.

In the exemplary embodiment of the present invention, the user may select the depth value 903 of the GUI and the electronic apparatus may output the GUI with the selected depth value 903 in a 3D format.

In the exemplary embodiment of the present invention, the user may select the fine position 904 where the GUI will be output. If the fine position 904 is selected, the GUI shown in FIG. 10 may be provided.

In the exemplary embodiment of the present invention, the GUI 910 of FIG. 9 may be provided according to the kind of the 3D GUI and the user may set the output position of the 3D GUI.

Accordingly, the output position of the GUI may be differently set according to the plurality of GUIs.

In addition, the GUI 910 of FIG. 9 may be provided to each user. A plurality of users may differently set the output positions of the 3D GUIs.

In this case, the output position information of the GUI is stored on a per user basis. If the user logs in to the electronic apparatus 900, the output position information of the GUI corresponding to the user who logs in to the electronic apparatus may be read and the 3D GUI may be output at the read output position.

Accordingly, in the present invention, it is possible to provide the GUI 910 for enabling the user to set the output position of a GUI to be output in 3D and determine and provide the output position of the 3D GUI according to user selection. Therefore, the user can perform menu setting selection at a desired position based on the user position.

Figure 10:
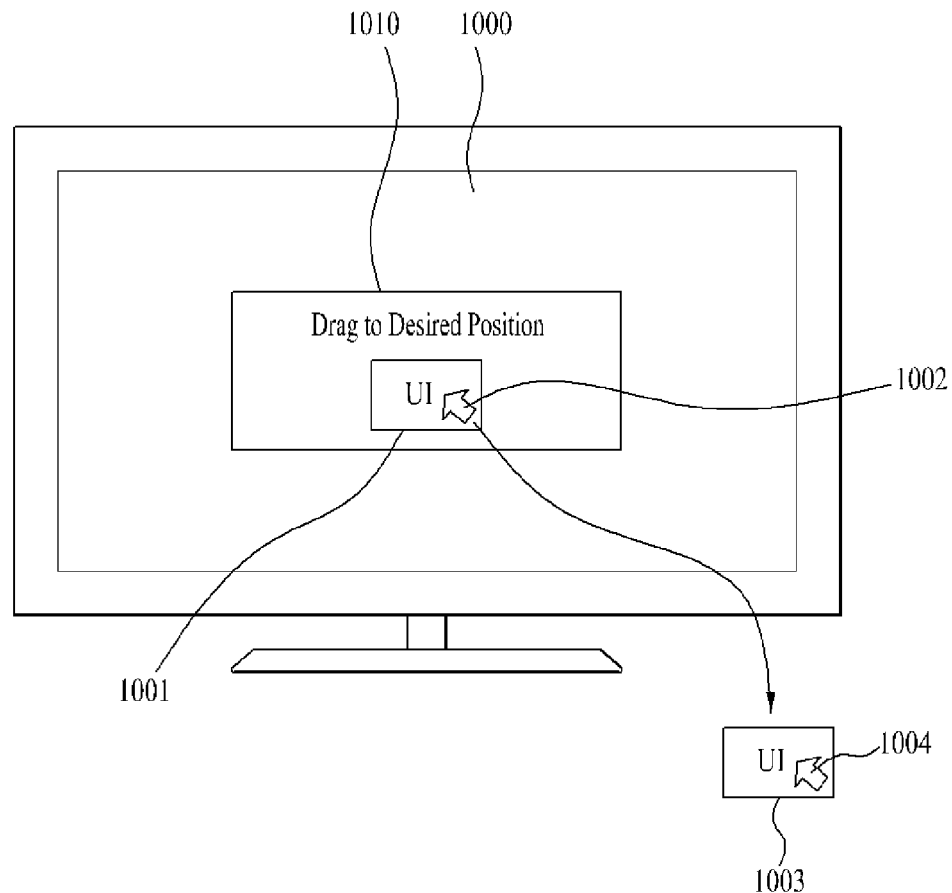
FIG. 10 is a diagram showing another example in which a user sets an output position of a 3D GUI according to an embodiment of the present invention.
Figure 10:
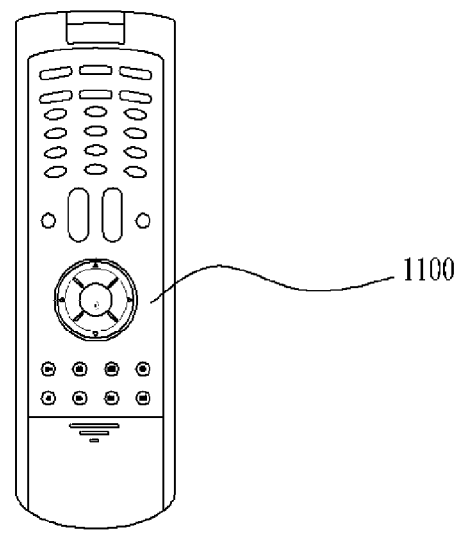

FIG. 10 is a diagram showing another example in which a user sets an output position of a 3D GUI according to an embodiment of the present invention.

When the user selects fine position 904 in the GUI setting 910 shown in FIG. 9, a GUI 1010 shown in FIG. 10 is output. The user may select and move a 3D GUI 1001 to a desired output position 1003.

At this time, the user may move a pointer 1002 located on the 3D GUI 1001 to a desired output position 1004 using a remote controller 110.

In an exemplary embodiment of the present invention, a pointing device and pointers 1002 and 1004 corresponding to the remote controller 1100 may be displayed.

The user may rotate the remote controller 110 or move the remote controller 110 in an up and down direction, a left and right direction or a forward and backward direction. The pointers 1002 and 1004 displayed on the electronic apparatus 1000 are moved in correspondence with movement of the remote controller 1100. The remote controller 1100 may be referred to as a pointing device because the pointers 1002 and 1004 are moved and displayed in correspondence with the movement of the remote controller in a 3D space.

Information about movement of the remote controller 1100 detected by a sensor of the remote controller 1100 is transmitted to the electronic apparatus 1000. The electronic apparatus 1000 may calculate the coordinates of the pointers 1002 and 1004 from the information about the movement of the remote controller 1100 and display the pointers 1002 and 1004 so as to correspond to the calculated coordinates.

The electronic apparatus 1000 may store the position information of the GUI 1003 moved in correspondence with the recognized user position in a memory, determine the output position of the GUI 1003 by referring to the memory when receiving a GUI output command, and output the GUI 1003 in a 3D format. Therefore, each 3D GUI may be output at a position set by each user.

Although FIG. 10 shows the case where the output position of the 3D GUI is set using the pointing device, the output position of the 3D GUI may be set using various methods such as a gesture recognition method or a motion recognition method.

Figure 11:
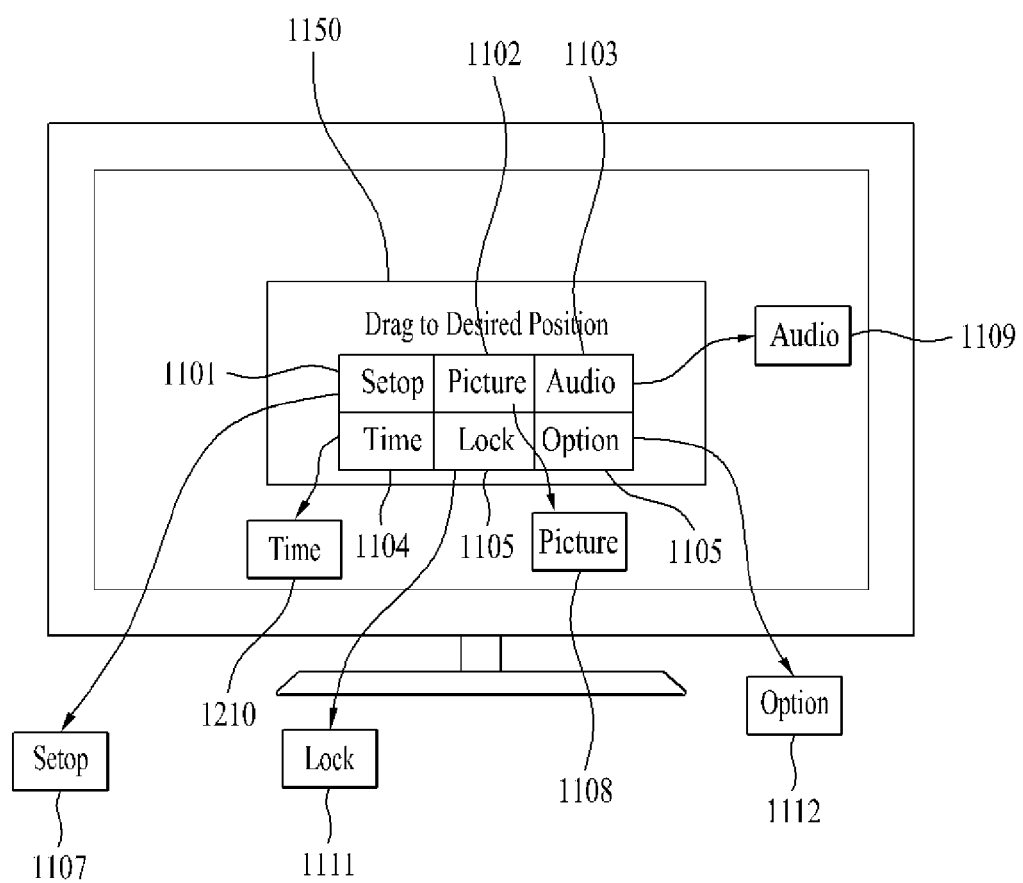
FIG. 11 is a diagram showing setting of an output position of each of a plurality of 3D GUIs according to an embodiment of the present invention.

FIG. 11 is a diagram showing setting of an output position of each of a plurality of 3D GUIs according to an embodiment of the present invention.

Referring to FIG. 11, when the user selects fine position setting 904 in the GUI shown in FIG. 9, a GUI 1150 shown in FIG. 11 may be output. The user may select and move a plurality of 3D GUIs 1101, 1102, 1103, 1104, 1105 and 1106 to desired output positions.

At this time, similarly to FIG. 10, the user may move a pointer located on each of the 3D GUIs 1101, 1102, 1103, 1104, 1105 and 1106 to a desired output position using the remote controller 1100.

For example, the user may move the first GUI 1101 to the desired output position 1107. The user may move the second GUI 1102 to the desired output position 1108. The user may move the third GUI 1103 to the desired output position 1109. The user may move the fourth GUI 1104 to the desired output position 1110, move the fifth GUI 1105 to the desired output position 1111, and move the sixth GUI 1106 to the desired output position 1112.

The user may select the 3D GUIs 1101, 1102, 1103, 1104, 1105 and 1106 using the remote controller 1100 and move the remote controller 1100 in the up and down direction, the left and right direction or the forward and backward direction so as to move 3D GUIs 1101, 1102, 1103, 1104, 1105 and 1106 to the desired output positions.

The electronic apparatus may store the position information 1107, 1108, 1109, 1110, 1111 and 1112 of the 3D GUIs moved in correspondence with the recognized user position in a memory, determine the output positions of the GUIs by referring to the memory when receiving a GUI output command, and output the GUIs in a 3D format. Therefore, each 3D GUI may be output at a position set by each user.

Although the embodiment in which the output positions of the plurality of 3D GUIs are set by dragging the pointing device is described, the output positions of the plurality of 3D GUIs may be set using the GUI 910 shown in FIG. 9.

As described above, the output positions of the plurality of 3D GUIs may be differently set on a per user basis. In this case, if a user enters a user ID and password so as to log in to the electronic apparatus, it is possible to output the plurality of 3D GUIs at the output positions set by the user.

Figure 12:
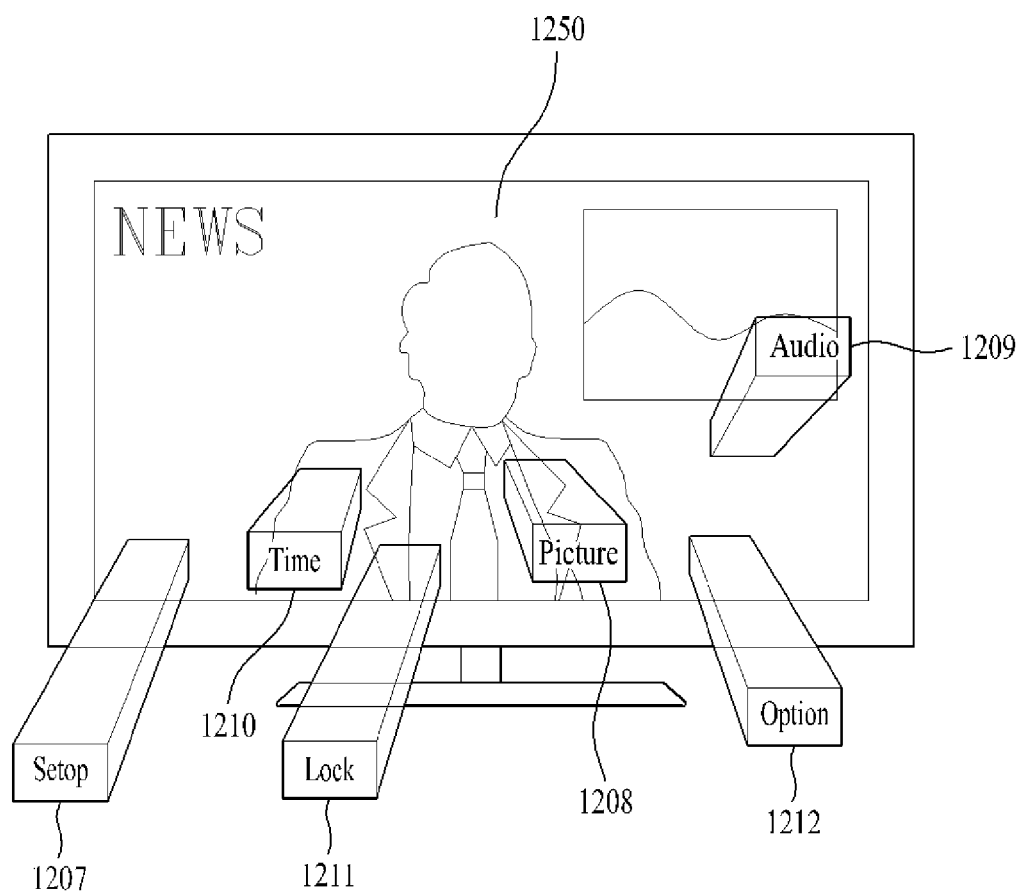
FIG. 12 is a diagram showing an output of a GUI at a predetermined distance from a user position according to another embodiment of the present invention.

FIG. 12 is a diagram showing an output of a GUI at a predetermined distance from a user position according to another embodiment of the present invention.

Referring to FIG. 12, 3D GUIs 1207, 1208, 1209, 1210, 1211 and 1212 may be displayed according to position information 1107, 1108, 1109, 1110, 1111 and 1112 of the 3D GUIs set in FIG. 11. That is, the 3D GUI 1207 may be displayed at the output position 1107 and the 3D GUI 1208 may be displayed at the output position 1108.

The 3D GUIs 1207, 1208, 1209, 1210, 1211 and 1212 may be displayed on the screen along with a received image 1250.

Figure 13:
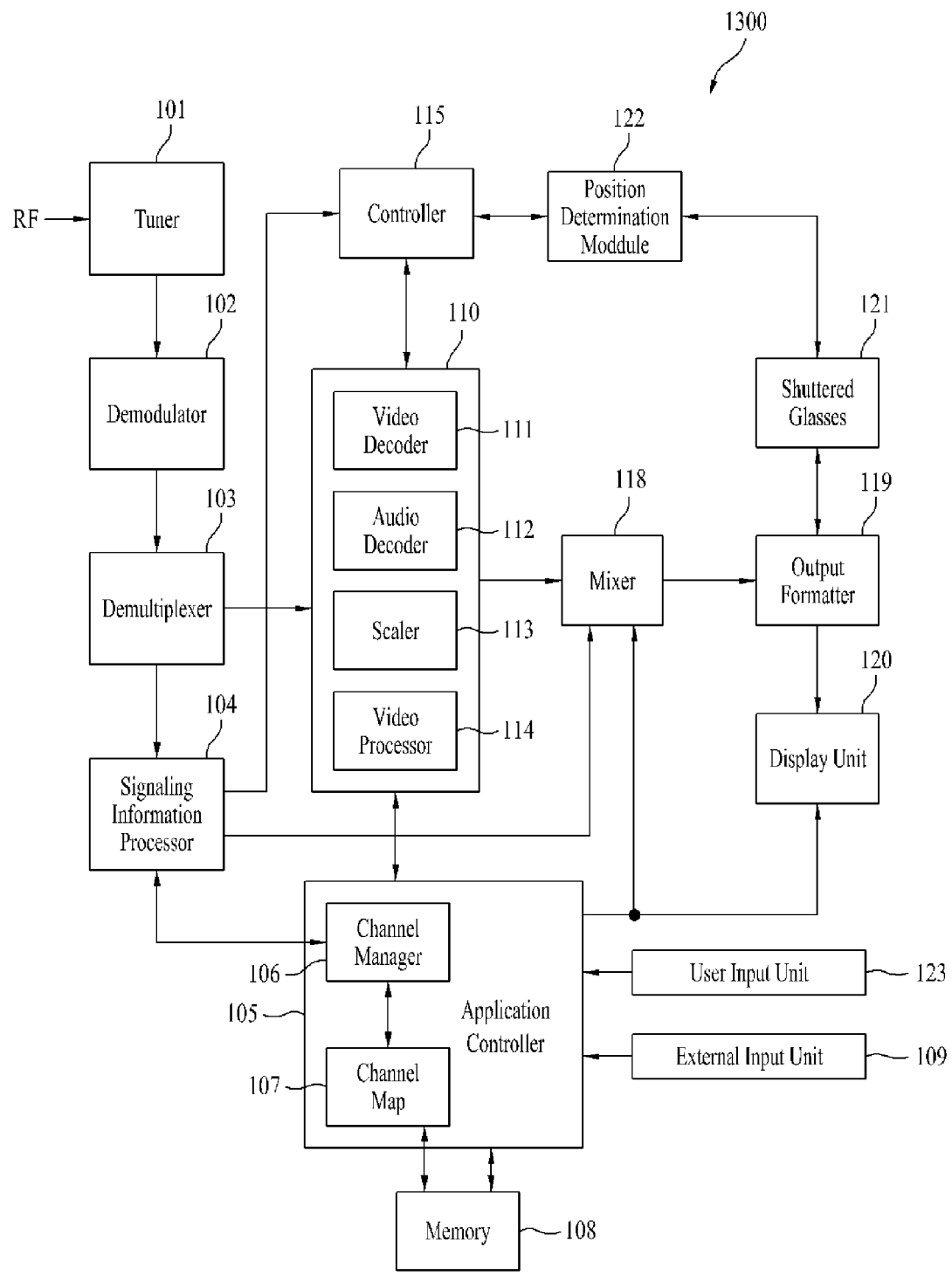
FIG. 13 is a block diagram showing the configuration of an electronic apparatus according to an embodiment of the present invention.

FIG. 13 is a block diagram showing the configuration of an electronic apparatus 1300 according to an embodiment of the present invention, when the electronic apparatus 100 of the present invention is a digital broadcast receiver.

Referring to FIG. 13, the electronic apparatus 1300 according to the present invention includes a tuner 101, a demodulator 102, a demultiplexer 103, a signaling information processor 104, an application controller 105, a memory 108, an external input reception unit 109, a decoder/scaler 110, a controller 115, a mixer 118, an output formatter 119 and a display unit 120. The digital broadcast receiver may further include other components in addition to the configuration of FIG. 13.

The tuner 101 tunes to a specific channel and receives a broadcast signal including content. The content may be a 3D image and the 3D image may be a stereo view image or a multi-view image.

The demodulator 102 demodulates the broadcast signal received from the tuner 101.

The demultiplexer 103 demultiplexes the demodulated broadcast signal into an audio signal, a video signal and signaling information. Demultiplexing may be performed through Packet IDentifier (PID) filtering. The signaling information may be, for example, System Information (SI) such as Program Specific Information/Program and System Information Protocol (PSI/PSIP) in the present specification, for convenience of description.

The demultiplexer 103 outputs the demultiplexed audio/video signal to the decoder/scaler 110 and outputs the signaling information to the signaling information processor 104.

The signaling information processor 104 processes the demultiplexed signaling information and outputs the processed signaling information to the application controller 105, the controller 115 and the mixer 118. The signaling information processor 104 may include a database (not shown) for temporarily storing the processed signaling information.

The application controller 105 includes a channel manager 106 and a channel map 107. The channel manager 106 may build and manage the channel map 107 based on the signaling information and control channel change based on the channel map 107 according to user input.

The decoder/scaler 110 includes a video decoder 111, an audio decoder 112, a scaler 113 and a video processor 114.

The video and audio decoders 111 and 112 receive and process the demultiplexed video and audio signals, respectively. The video signal may include a signal for displaying a left-view image and a signal for displaying a right-view image.

The scaler 113 scales the signals processed by the decoders 111 and 112 to output signals each having an appropriate size.

A user input unit 123 receives user key input through a remote controller.

The application controller 105 may further include an OSD data generator (not shown) for GUI configuration. Alternatively, the OSD data generator may generate OSD data for GUI configuration under control of the application controller 105. In some embodiments, the controller 115 may control generation of the OSD data.

The application controller 105 may access a first set of pixel data for displaying the left-view image of the GUI and a second set of pixel data for displaying the right-view image of the GUI in the memory 108. The application controller 105 may adjust a gap between a pixel included in the accessed first set of pixel data and a pixel included in the second set of pixel data based on a depth setting value according to the method of FIG. 7. In some embodiments, instead of the application controller 105, the controller 115 may access the first set of pixel data and the second set of pixel data and adjust the gap between the pixels.

The display unit 120 outputs the content, the GUI, etc.

The mixer 118 mixes the signals received from the signaling processor 104, the decoder/scaler 110 and the application controller 105 and outputs the mixed signal. The mixer 118 may mix the left-view image data output from the video decoder 111 and the first set of pixel data output from the application controller 105 and mix the right-view image data output from the video decoder 111 and the second set of pixel data output from the application controller 105.

The output formatter 119 configures the output of the mixer 118 to suit the output format of the display unit. The output formatter 119 may operate, for example, as an output formatter for bypassing a two-dimensional (2D) image and processing a 3D image to suit a 3D format such as an output frequency of the display unit 120 under the control of the controller 115.

The output formatter 119 outputs 3D image data to the display unit 120, and generates and outputs a synchronization signal Vsync of the 3D image data for synchronization when viewing the output 3D image data with shuttered glasses 121 to an IR emitter (not shown) in the shuttered glasses, such that the user views the 3D image with the shuttered glasses 121.

The electronic apparatus 1300 further includes a position determination module 122 for determining a user position change value and the position determination module 122 senses the position of the user at a predetermined time interval.

The user input unit 123 receives a GUI output command.

The position determination module 122 determines the position of the user according to the GUI output command. The position determination module 122 may determine the position of the user using the method of FIG. 4.

The controller 115 determines the output position of the GUI according to the determined position of the user. At this time, the controller 115 may determine the depth value of the GUI such that the distance between the GUI and the user becomes a predetermined value.

The controller 115 may determine the depth value of the GUI such that the distance between the GUI and the user becomes a distance set by the user. The depth value of the GUI may be adjusted based on the determined depth value.

The output formatter 119 outputs the left-view image data and the right-view image data for displaying the GUI with the adjusted depth value in a 3D format.

The user input unit 124 may enable the user to set the output position of the GUI in correspondence with the position of the user.

The memory 108 may store the output position information of the GUI and the controller 115 may determine the output position of the GUI by referring to the memory 108.

The memory 108 may store a set of GUI data for providing the GUI in advance. The set of GUI data may include a first set of pixel data for a left-view image and a second set of pixel data for a right-view image. That is, the first set of pixel data and the second set of pixel data enable the GUI to be displayed in a 3D image. The first set of pixel data may be left-view image data and the second set of pixel data may be right-view image data.

The memory 108 may store supplementary information associated with the broadcast receiver.

In an exemplary embodiment of the present invention, the position determination module 122 may sense the position of the user and adjust the depth value of the GUI such that the output position of the GUI is changed according to change in user position.

The position determination module 122 may determine the position of the user according to the GUI output command if the electronic apparatus 1300 is set to a 3D output mode.

The IR emitter receives and outputs the synchronization signal generated by the output formatter 119 to a light receiving unit (not shown) included in the shuttered glasses 121. The shuttered glasses 121 adjust a shutter open period according to the synchronization signal received from the IR emitter (not shown) through the light receiving unit and performs synchronization with the 3D image data output from the display unit 120.

The external input reception unit 109 may provide an interface for connecting an external device and the electronic apparatus 1300. The external device includes various video or audio output devices such as a Digital Versatile Disk (DVD), a Blu-ray device, a game console, a camcorder and a computer (laptop). The electronic apparatus 1300 may control the display of the video signal and the audio signal received from the external input reception unit 109 and store and use a data signal. The video signal may be a 3D video signal.

Figure 14:
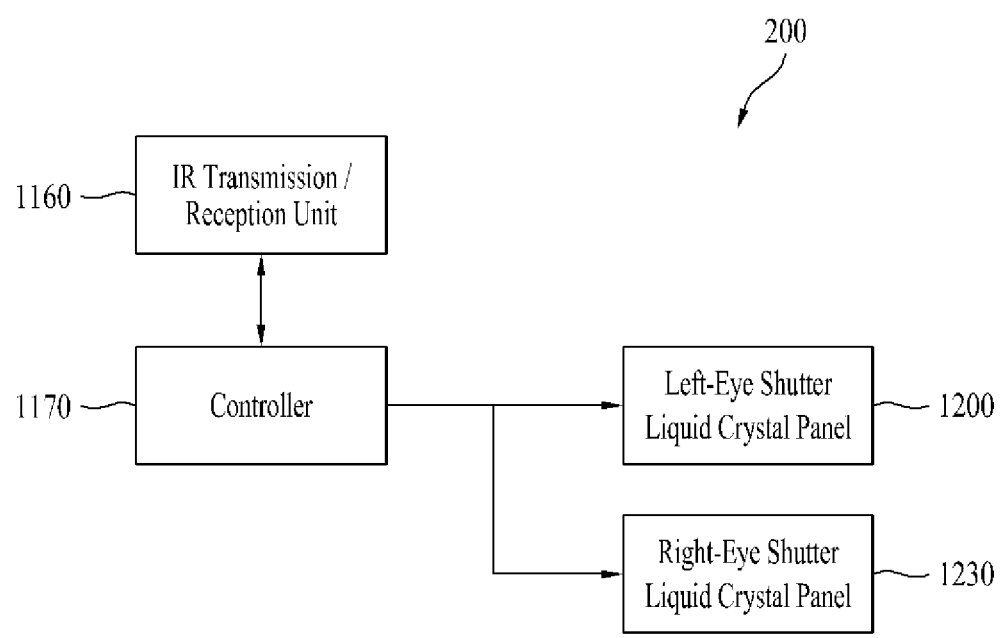
FIG. 14 is a diagram showing the configuration of shuttered glasses according to an embodiment of the present invention.

FIG. 14 is a diagram showing the configuration of shuttered glasses according to an embodiment of the present invention.

Referring to FIG. 14, the shuttered glasses 200 include a left-eye shutter liquid crystal panel 1200 and a right-eye shutter liquid crystal panel 1230. The shutter liquid crystal panels 1200 and 1230 serve to pass or block light according to a source driving voltage. When a left-view image is displayed by the electronic apparatus 100, the left-eye shutter liquid crystal panel 1200 passes light and the right-eye shutter liquid crystal panel 1230 blocks light such that the left-view image is delivered to the left eye of the user. When a right-view image is displayed by the electronic apparatus 100, the left-eye shutter liquid crystal panel 1230 blocks light and the right-eye shutter liquid crystal panel 1230 passes light such that the right-view image is delivered to the right eye of the user.

In this process, an IR transmission/reception unit 1160 of the shuttered glasses 200 converts an IR signal received from the electronic apparatus 100 into an electrical signal and provides the electrical signal to a controller 1170. The controller 1170 controls the left-eye shutter liquid crystal panel 1200 and the right-eye shutter liquid crystal panel 1230 to be alternately turned on/off according to a synchronization reference signal.

As described above, the shuttered glasses may further include an IR sensor for detecting the user position and the IR transmission/reception unit 1160 may transmit the information detected by the IR sensor to the electronic apparatus.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of displaying a graphical user interface (GUI), the method comprising:
    displaying a menu for setting a distance between a 3-dimensional (3D) image of the GUI and a user;
    receiving a signal for setting the distance between the 3D image of the GUI and the user to a specific distance through the menu;
    displaying the 3D image of the GUI at a first output position when the user is positioned at a first position; and
    displaying the 3D image of the GUI at a second output position which is different from the first output position when the user is positioned at a second position which is different from the first position,
    wherein the distance between the 3D image of the GUI and the user is maintained constantly as the specific distance by changing a depth value of the 3D image of the GUI according to a change of a position of the user, and
    wherein a size of the 3D image of the GUI perceived by the user is maintained constantly regardless of the change of the position of the user.

2. The method according to claim 1, wherein the displaying the 3D image of the GUI at the first output position includes determining a position of the user, calculating a depth setting value based on a predetermined distance value and the determined position, and adjusting the depth value of the 3D image of the GUI based on the calculated depth setting value.

3. The method according to claim 2, wherein the depth value is adjusted such that the distance between the user and the 3D image of the GUI becomes the predetermined distance value.

4. The method according to claim 2, wherein the adjusting the depth value includes:
    accessing a first set of pixel data for displaying one left-view image and a second set of pixel data for displaying one right-view image of GUIs in a storage medium; and
    adjusting a gap between a pixel included in the accessed first set of pixel data and a pixel included in the accessed second set of pixel data based on the depth setting value.

5. The method according to claim 4, further comprising:
    receiving the 3D image including left-view image data and right-view image data;
    mixing the left-view image data and the first set of pixel data and mixing the right-view image data and the second set of pixel data; and
    outputting an image signal for displaying the mixed left-view image data and the mixed right-view image data to a display.

6. The method according to claim 2, further comprising determining whether the position of the user is changed, wherein the determining the position of the user is performed at a predetermined time interval and, when the position of the user is changed, the depth setting value is calculated.

7. The method according to claim 1, further comprising mixing sets of pixel data for displaying the 3D image of the GUI based on the output positions.

8. The method according to claim 1, further comprising:
    receiving a command for requesting output position setting; and
    displaying a GUI for setting an output position of the 3D image of the GUI in response to the received command.

9. The method according to claim 8, wherein the output positions are determined based on a position where the 3D image is located.

10. The method according to claim 9, wherein the 3D image is moved according to detected user action.

11. The method according to claim 1, further comprising:
    determining a position of the user using information detected at a sensor or information received from predetermined glasses.

12. The method according to claim 1, wherein the first output position and the second output position of the 3D image of the GUI are differently set according to a plurality of users.

13. An electronic apparatus comprising:
    a display; and
    a controller to:
    control the display to display a menu for setting a distance between a 3-dimensional (3D) image of a GUI and a user,
    receive a signal for setting the distance between the 3D image of the GUI and the user to a specific distance through the menu,
    control the display to display the 3D image of the GUI at a first output position when the user is positioned at a first position, and
    control the display to display the 3D image of the GUI at a second output position which is different from the first output position when the user is positioned at a second position which is different from the first position,
    wherein the distance between the 3D image of the GUI and the user is maintained constantly as the specific distance by changing a depth value of the 3D image of the GUI by the controller according to a change of a position of the user, and
    wherein a size of the 3D image of the GUI perceived by the user is maintained constantly regardless of the change of the position of the user.

14. The electronic apparatus according to claim 13, further comprising:
    a sensor to determine a position of the user,
    wherein the controller calculates a depth setting value based on a predetermined distance value and the determined position, adjusts depth values of a plurality of graphical user interfaces (GUIs) based on the calculated depth setting value, and controls the display to display the 3D image of the GUI with the adjusted depth values.

15. The electronic apparatus according to claim 14, wherein the controller adjusts the depth value such that the distance between the user and the 3D image of the GUI becomes the predetermined distance value.

16. The electronic apparatus according to claim 14, wherein the controller accesses a first set of pixel data for displaying one left-view image and a second set of pixel data for displaying one right-view image of the GUIs in a storage medium, and adjusts a gap between a pixel included in the accessed first set of pixel data and a pixel included in the accessed second set of pixel data based on the depth setting value.

17. The electronic apparatus according to claim 16, further comprising:
- a receiver to receive the 3D image including left-view image data and right-view image data;
- a mixer to mix the left-view image data and the first set of pixel data and mix the right-view image data and the second set of pixel data; and
- a formatter to output an image signal for displaying the mixed left-view image data and the mixed right-view image data.

18. The electronic apparatus according to claim 14, further comprising a mixer to mix sets of pixel data for displaying the 3D image of the GUI based on the output positions.

19. The electronic apparatus according to claim 14, wherein the sensor senses the position of the user at a predetermined time interval, and the controller determines whether the position of the user is changed and calculates the depth setting value based on the changed position of the user when the position of the user is changed.

20. The electronic apparatus according to claim 13, wherein the controller receives a command for requesting output position setting, and controls display of the GUI for setting an output position of the 3D image of the GUI in response to the received command.

* * * * *